United States Patent [19]
Shelley

[11] 4,345,113
[45] Aug. 17, 1982

[54] AUTOMATIC TELEPHONE MESSAGE INTERCEPTION SYSTEM

[76] Inventor: Edwin F. Shelley, 339 Oxford Rd., New Rochelle, N.Y. 10804

[21] Appl. No.: 111,989

[22] Filed: Jan. 14, 1980

[51] Int. Cl.$^3$ ............................................. H04M 1/64
[52] U.S. Cl. .................................. 179/2 A; 179/84 C; 179/6.07
[58] Field of Search .................... 179/2 R, 2 A, 2 AS, 179/84 R, 84 C, 89, 6.03, 6.07, 6.11

[56] References Cited
U.S. PATENT DOCUMENTS 3,716,673  2/1973  Meri ................................... 179/6.03

*Primary Examiner*—Joseph A. Popek
*Attorney, Agent, or Firm*—Kenyon & Kenyon

[57] ABSTRACT

An automatic telephone message interception system which is connected in series between a telephone instrument and incoming telephone lines. The system intercepts an incoming call and, upon the detection of a code signal on the telephone lines, connects the lines to an information storage device without causing the telephone instrument to ring. The system disconnects the storage device from the telephone lines and restores the system to its original condition upon the detection of another code signal on the telephone lines. In the event a code signal is not detected after reception of an incoming call, the system connects the telephone lines to the telephone instrument, which then operates in a normal manner.

9 Claims, 1 Drawing Figure

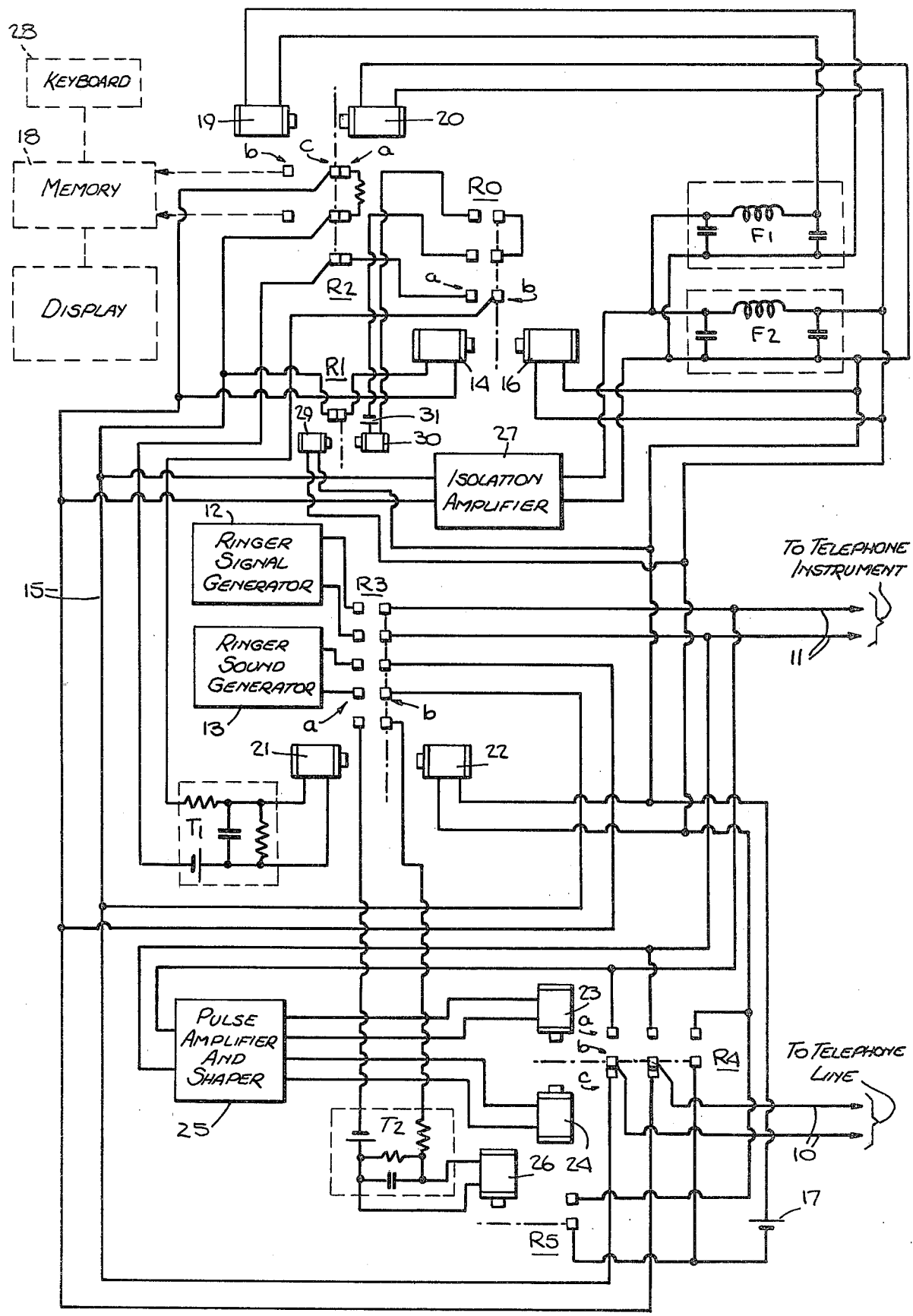

AUTOMATIC TELEPHONE MESSAGE INTERCEPTION SYSTEM

BACKGROUND OF THE INVENTION

1. Field of the Invention

This invention relates generally to telephone answering systems, and in particular to an automatic telephone message interception system which intercepts an incoming telephone call and connects the call to an information storage device at the location of the telephone instrument without causing the telephone instrument to ring.

2. Description of the Prior Art

Various systems are presently in existence which are adapted to be connected to a telephone instrument for automatically answering telephone calls. For example, telephone answering systems exist which will play a recorded message when a call is received and permit the recording of a message from the caller. These systems, which are usually tape recording devices, as well as others which are presently in existence, however, do not permit an incoming call to be intercepted without causing the telephone instrument to which they are connected to ring.

Under certain circumstances, for example, during the polling of individuals by telephone in an opinion survey in which information is collected by retrieving data placed by an individual in a storage device, such as a tape recorder, connected to the individual's telephone, it may be desirable to collect data from such individuals at various times during the day or night. Collection of data during the night is generally precluded at present due to the fact that the data cannot be retrieved from the storage device connected to the individual's telephone without causing the telephone to ring, thereby disturbing the individual. Collection of data during the day also may, for the same reason, disturb an individual, although to a lesser extent than collection during the night. The same problem also exists in cable television systems, where it may be desired to transmit information to an information storage device connected to a subscriber's telephone as well as to retrieve information.

The need thus exists for a telephone answering system which will permit the transmission and collection of information to and from an information storage device connected to a telephone instrument without causing the instrument to ring and without interfering with the ordinary use of the telephone instrument.

SUMMARY OF THE INVENTION

It is therefore an object of the present invention to overcome the aforementioned disadvantages of prior art telephone answering systems and to provide an improved automatic telephone message interception system which intercepts an incoming call to a telephone instrument and permits the transmission and collection of information to and from an information storage device connected to the instrument without causing the telephone instrument to ring and without interfering with the ordinary use of the telephone instrument.

These and other objects of the present invention are achieved in an automatic telephone message interception system adapted to be coupled in series with a telephone transmission line and a telephone instrument for connecting an incoming telephone call on the transmission line to an information storage means without ringing the telephone instrument. The system comprises first means, coupled to the transmission line and the telephone instrument, for electrically disconnecting the transmission line from the telephone instrument and normally maintaining the transmission line electrically disconnected from the instrument; second means, coupled to the first means and to the telephone transmission line, for detecting a first coded transmission signal transmitted on the transmission line during an incoming telephone call and connecting the transmission line to the information storage means in response to the detection of the signal; and third means, coupled to the first means, second means and the transmission line, for detecting a second coded transmission signal transmitted on the transmission line during the incoming telephone call and disconnecting the transmission line from the information storage means in response to the detection of the second signal.

These and other novel features and advantages of the invention will be described in greater detail in the following detailed description.

BRIEF DESCRIPTION OF THE DRAWING

The drawing is a schematic diagram of an improved automatic telephone message interception system constructed according to the present invention.

DETAILED DESCRIPTION

Referring now to the drawing, there is shown an automatic telephone message interception system which is coupled in series with a telephone transmission line and a telephone instrument. The telephone transmission line is schematically represented by a pair of input lines 10 and is coupled to a plurality of relays R0, R1, R2, R3 and R4 which comprise part of the interception system. The telephone instrument is connected to a pair of lines 11 and relay R3. Another relay R5 also comprises part of the interception system.

The first of the relays of the system, relay R0, includes two sets of electrical contacts, each including three contacts, contacts a on one side of the relay, two of which are connected to relay R1 and one of which is connected to relay R2, and contacts b on the other side of the relay, two of which are electrically interconnected and the third of which is connected to an RC timing circuit T1, which will be described in detail later herein. Relay R0 also includes a latch coil 14 which is coupled to a pair of internal system transmission lines 15 coupled to telephone input lines 10 through relay R4, and a release, i.e., unlatch coil 16 which is connected to a d-c voltage source 17 such as a battery. Relay R1 includes two electrical contacts which are coupled in series relationship to one input terminal of latch coil 14 of relay R0. Relay R1 also includes a latch coil 29 coupled to d-c voltage source 17 and relays R4 and R5 and a release coil 30 coupled to another d-c voltage source 31 and relay R0. Relay R2 includes three sets of electrical contacts, three contacts a on one side of the relay, two of which are electrically interconnected by a resistor and one of which is connected to relay R0, two contacts b on the other side of the relay which are connected to an information storage device, for example, a memory 18, and three contacts c in the center of the relay, two of which are connected to lines 15 and the third of which is connected to RC timing circuit T1. Relay R2 also includes a latch coil 19 which is connected to an LC signal detection circuit F1, and a release coil 20 which is connected to another LC signal detection circuit F2. Relay R3 includes two sets of electrical contacts, five contacts a on one side of the relay which are connected to a ringer signal generator 12, which generates a ringing signal which is transmitted to the telephone instrument over lines 11 and causes the instrument to ring, a ringer sound generator 13, which generates a conventional audible ringing signal which is transmitted to lines 10 so that a caller knows the telephone instrument is ringing, and to one input terminal of another RC timing circuit T2, and five contacts b on the other side of the relay which are connected to lines 11 and 15 and the other input terminal of timing circuit T2. Relay R3 includes a latch coil 21 which is connected to the output terminals of timing circuit T1 and a release coil 22 which is connected to d-c voltage source 17 and relays R4 and R5. Relay R4 includes three sets of electrical contacts, three contacts a on one side of the relay which are connected to lines 11 and relays R0, R1, R2, R3 and R5, three center contacts b which are connected to telephone lines 10 and to relay R5 and d-c voltage source 17, and two contacts c on the other side of the relay which are connected to lines 15. Relay R4 includes a latch coil 23 and a release coil 24 which are connected to the output terminals of a pulse amplifier and shaper 25, described in detail later herein. Relay R5 includes a single pair of contacts, one of which is connected to d-c voltage source 17 and the other of which is connected to relays R3 and R4. Relay R5 includes a coil 26 which is connected to the output terminals of timing circuit T2.

The signal detection circuits F1 and F2 are conventional LC filter circuits, the inductance and capacitance of which are chosen so as to permit a tone signal of a predetermined frequency to pass through the filters to coils 19 and 20 of relay R2. The tone signal selected to pass through the filter circuit F1 has a different frequency than that selected to pass through filter circuit F2. The input terminals of circuits F1 and F2 are connected to the output terminals of a high input impedance, low output impedance isolation amplifier 27 whose input terminals are connected to lines 15. The output terminals of circuits F1 and F2 are connected to latch coil 19 and release coil 20 of relay R2, respectively. It should be noted that although detection circuits F1 and F2 have been illustrated as filter circuits, various other types of detectors and forms of input signals may be utilized.

The timing circuits T1 and T2 are conventional RC circuits, the time constants of which are determined by the values of the resistors and capacitors chosen for the circuits. Timing circuit T1 preferably has a time constant, i.e., the period of time which elapses from the time a voltage is applied to the input terminals of the circuit until the voltage across the output terminals of the circuit rises to approximately 70% of the level of the input voltage, of approximately 2 seconds, and circuit T2 preferably has a time constant of 30 seconds. It should be noted that these time constants are merely exemplary and may be varied according to the needs of a particular application of the system. Each of the circuits includes a d-c voltage source such as a battery coupled to its input terminals.

The pulse amplifier and shaper 25 includes conventional circuitry for amplifying and shaping pulse signals. Signals of opposite polarity, i.e., positive and negative, are generated on lines 11 when the receiver of the telephone instrument is picked up and replaced, and these signals are amplified and shaped by shaper 25 so as to be of the required magnitude and form to energize coils 23 and 24 of relay R4. The shaper circuitry of amplifier and shaper 25 further performs a rectifying function so that the shaper discriminates between the positive and negative pulses generated by the telephone instrument. If, for example, a positive pulse signal is generated when the receiver of the telephone instrument is picked up, the shaper circuitry will permit this pulse to pass through the shaper only to the output terminals connected to latch coil 23 of relay R4. Similarly, if a negative pulse signal is generated when the receiver of the telephone instrument is replaced, the shaper circuitry will permit this pulse to pass through the shaper only to the output terminals connected to release coil 24 of relay R4. The shaper circuitry thus also functions as a pulse discriminator and blocks the transmission of a positive pulse to coil 24 and a negative pulse to coil 23.

The information storage device may comprise a memory 18, as illustrated in the drawing, for example, a solid state memory or storage device for storing binary information comprising solid state switches. It may also comprise a typewriter, a tape recorder or a display device, such as a CRT display. Whatever form of storage device is used, it should be suitably buffered so that its impedance matches that of the telephone transmission lines 10. A manual input means, such as a keyboard 28, may be connected to the device to enable information to be entered into the device. Ringer signal generator 12 is of the same design as that presently used in central telephone switching offices to generate an audible ringing signal on telephone transmission lines for ringing a telephone instrument. Ringer sound generator 13 is of the same design as that presently used in central telephone switching offices to generate an audible ringing signal on telephone transmission lines, simultaneous with the ringing signal transmitted to the telephone instrument, to indicate to a caller that the instrument is ringing.

In operation, the circuit of the invention is connected in series with transmission lines 10 and a telephone instrument in the manner illustrated in the drawing. The circuit is designed so that the lines 10 are electrically disconnected from the telephone instrument and are normally maintained in this electrically disconnected condition by the circuit. In this condition, the circuit is ready to receive an incoming call and intercept a message which may be transmitted during the call. When a ringing signal is generated on lines 10, the circuit transmits the signal from lines 10 through the contacts b and c of relay R4 to lines 15 and two of the three contacts c of relay R2, and at the same time, to latch coil 14 of relay R0. This causes contacts a and b of relay R0 to close, thereby energizing release coil 30 of relay R1 and causing the relay to unlatch and energizing timing circuit T1. If the first coded signal, i.e., the tone signal generated at the first frequency, is generated on lines 10 within the time constant of circuit T1, the signal is transmitted through isolation amplifier 27 and detector circuit F1 to latch coil 19 of relay R2. The signal energizes coil 19 and thereby causes contacts b and c of relay R2 to close and connect lines 15 to memory 18 and contacts a and c to open and deenergize timing circuit T1. Information can then be read into or out of memory 18 by generating an appropriate control signal on telephone lines 10 in a manner already known in the art. When the information has been read into or out of the memory, a second coded signal, i.e., the tone signal generated at the second frequency, is generated on lines 10 and is passed through isolation amplifier 27 and detection circuit F2 to release coil 20 of relay R2. The signal energizes the release coil and causes contacts b and c to open and a and c to close thereby disconnecting memory 18 from lines 15. The signal is also simultaneously transmitted to release coil 16 of relay R0 and latch coil 29 of relay R1, thereby energizing the coils and opening contacts a and b of relay R0 and closing the contacts of relay R1 and restoring the circuit to its normal condition in which the telephone instrument is disconnected from lines 10.

If no signal is detected by detection circuit F1 after the time constant of timing circuit T1 elapses, i.e., after two seconds, relay R2 is not latched and instead the timing circuit energizes latch coil 21 of relay R3 and closes contacts a and b of relay R3, thereby connecting ringer signal generator 12, which generates a ringing signal which causes the telephone instrument to ring, to the instrument, and ringer sound generator 13, which simultaneously generates an audible ringing signal which is heard by the caller, to lines 15 and telephone lines 10, and energizing timing circuit T2. If the receiver of the instrument is lifted to answer the call, a pulse of either a negative or positive polarity is generated by the instrument on lines 11. This pulse is transmitted through pulse amplifier and shape 25 to latch coil 23 of relay R4 which energizes the coil and causes contacts a and b to close and directly connect telephone lines 10 to lines 11 and the telephone instrument. The closing of contacts a and b of relay R4 also energizes release coil 22 of relay R3, thereby opening contacts a and b of the relay and disconnecting ringer signal generator 12 and ringer sound generator 13 and deactivating timing circuit T2, release coil 16 of relay R0, thereby opening contacts a and b of that relay, and latch coil 29 of relay R1, thereby closing the contacts of that relay. When the call is terminated by replacing the receiver on the telephone instrument, a pulse of opposite polarity is generated by the telephone instrument and is transmitted through pulse amplifier and shaper 25 to the release coil 24 of relay R4, thereby opening contacts a and b of the relay and restoring the instrument to its electrically disconnected condition. If the incoming call is not answered before the time constant of timing circuit T2 elapses, i.e., 30 seconds, the circuit energizes coil 26 of relay R5 and causes the contacts thereof to close, thereby energizing release coils 22 and 16 of relays R3 and R0, respectively, which causes relays R3 and R0 to unlatch and deenergize timing circuits T1 and T2, which permits the contacts of relay R5 to open. Timing circuit T2 also energizes latch coil 29 of relay R1, thereby latching that relay and disconnecting the call from the circuit, and restoring the circuit to its normal condition ready to intercept another incoming call.

The circuit of the system also automatically disconnects memory 18 from lines 15 if the receiver of the telephone instrument is picked up after the first coded signal is detected but prior to detection of the second coded signal if, for example, in an emergency, the telephone instrument is desired to be used to make a call. When the receiver is picked up, the instrument will, as previously explained, generate a pulse signal which causes contacts a and b of relay R4 to close and connect the instrument to lines 10. Closing of these contacts also energizes release coils 20 and 16 of relays R2 and R0 and latch coil 29 of relay R1 thereby disconnecting the call. In order to prevent inadvertent disconnection of a call during transmission or retrieval of information to or from memory 18, a pilot light may be connected to the circuit to visually indicate that it is in operation. When the circuit is in its normal condition ready to intercept an incoming call and the receiver of the instrument is lifted to make an outgoing telephone call, the instrument is connected to the telephone lines 10 by relay R4 in the same way described immediately above. A telephone call can then be made in the usual manner. When the receiver is replaced after completion of the call, the pulse generated unlatches contacts a and b of relay R4 in the manner previously described and returns the circuit to its normal condition. It should be noted that the relay switches utilized in the illustrated embodiment of the invention may be replaced by suitable solid state switching circuitry.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawing are, accordingly, to be regarded in an illustrative rather than in a restrictive sense.

What is claimed is:

1. An automatic telephone message interception system adapted to be coupled in series with a telephone transmission line and a telephone instrument for connecting an incoming telephone call on said transmission line to an information storage means without ringing said telephone instrument, comprising
    first means, coupled to said transmission line and said telephone instrument, for electrically disconnecting said transmission line from said telephone instrument and normally maintaining said transmission line electrically disconnected from said instrument,
    second means, coupled to said first means and to said telephone transmission line, for detecting a first coded transmission signal transmitted on said transmission line during an incoming telephone call and connecting said transmission line to said information storage means in response to the detection of said signal, and
    third means, coupled to said first means, second means and said transmission line, for detecting a second coded transmission signal transmitted on said transmission line during said incoming telephone call and disconnecting said transmission line from said information storage means in response to the detection of said second signal.

2. The system recited in claim 1, wherein said second and third detecting means comprise first and second filter means, and wherein said first and second coded transmission signals comprise first and second tone signals each generated at a different frequency which are selectively passed by said first and second filter means, respectively.

3. The system recited in claim 1, further comprising fourth means, coupled to said telephone instrument and to said first means, for connecting said telephone instrument to said transmission line in response to a first signal generated by said telephone instrument.

4. The system recited in claim 3, wherein said fourth means includes means coupled to said third means for disconnecting said transmission line from said information storage means in response to said signal generated by said telephone instrument.

5. The system recited in claim 3, wherein said fourth means includes means for disconnecting said telephone instrument from said transmission line and restoring said instrument to its electrically disconnected condition with respect to said transmission line after said telephone instrument is connected to said transmission line in response to said first signal generated by said instrument in response to a second signal generated by said telephone instrument.

6. The system recited in claim 5, wherein said first and second signals generated by said telephone instrument comprise pulse signals of opposite polarity, and wherein said fourth means includes pulse discriminator means for discriminating between said pulse signals generated by said telephone instrument and connecting and disconnecting said telephone instrument to said transmission line in response to the generation of said first and second signals, respectively, by said telephone instrument.

7. The system recited in claim 3, wherein said second means includes first timing means for causing said telephone instrument to ring if said first coded transmission signal is not detected on said transmission line during said incoming telephone call by said second means within a predetermined period of time.

8. The system recited in claim 7, wherein said second means further comprises means for generating a ringing signal for causing said telephone instrument to ring which is connected to said telephone instrument by said first timing means if said first coded transmission signal is not detected on said transmission line during said incoming telephone call by said second means within said predetermined period of time, and means for generating an audible ringing signal on said transmission line simultaneous with the generation of said ringing signal for said telephone instrument.

9. The system recited in claim 8, wherein said second means includes second timing means for disconnecting said telephone instrument for said ringing signal generating means if said telephone instrument is not connected by said fourth means to said transmission line in response to a first signal generated by said telephone instrument within a predetermined period of time after said ringing signal generating means is connected to said telephone instrument by said first timing means.

* * * * *